(12) United States Patent
Shingyoji

(10) Patent No.: US 10,852,442 B2
(45) Date of Patent: Dec. 1, 2020

(54) RECEPTION CONTROL DEVICE

(71) Applicant: CASIO COMPUTER CO., LTD., Tokyo (JP)

(72) Inventor: Ryuji Shingyoji, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 171 days.

(21) Appl. No.: 16/086,541

(22) PCT Filed: Dec. 28, 2016

(86) PCT No.: PCT/JP2016/089155
§ 371 (c)(1),
(2) Date: Sep. 19, 2018

(87) PCT Pub. No.: WO2017/163530
PCT Pub. Date: Sep. 28, 2017

(65) Prior Publication Data
US 2019/0041529 A1    Feb. 7, 2019

(30) Foreign Application Priority Data
Mar. 24, 2016    (JP) .................................. 2016-060474

(51) Int. Cl.
*G01S 19/25*    (2010.01)
*G01S 19/34*    (2010.01)
*G01S 19/40*    (2010.01)

(52) U.S. Cl.
CPC ............. *G01S 19/25* (2013.01); *G01S 19/34* (2013.01); *G01S 19/40* (2013.01)

(58) Field of Classification Search
CPC .......... G01S 19/05; G01S 19/09; G01S 19/25; G01S 19/34; G01S 19/40; G01S 19/42; G01S 19/48
(Continued)

(56) References Cited

U.S. PATENT DOCUMENTS

2010/0164788 A1    7/2010    Ghaida
2011/0144911 A1*   6/2011    Madhavan ............. G01C 21/00
                                                        701/472
(Continued)

FOREIGN PATENT DOCUMENTS

JP    2001235531 A    8/2001
JP    2006119062 A    5/2006
(Continued)

OTHER PUBLICATIONS

International Search Report (ISR) dated Feb. 14, 2017 issued in International Application No. PCT/JP2016/089155.
(Continued)

*Primary Examiner* — Harry K Liu
(74) *Attorney, Agent, or Firm* — Holtz, Holtz & Volek PC

(57) ABSTRACT

A positioning position is corrected more efficiently. A reception control device, comprising: a processor, wherein the processor executes: a reception parameter acquisition process of acquiring reception parameters related to reception of positioning signals from a positioning signal receiver that receives the positioning signals from positioning satellites; a first reception environment determination process of determining a reception environment on the basis of a result of determining the acquired reception parameters in accordance with determination conditions; and a reception control process of controlling an error correction signal receiver that receives an error correction signal for correcting an error of a positioning result by the positioning signals from an error correction satellite on the basis of a determination result in the first reception environment determination process.

10 Claims, 3 Drawing Sheets

(58) Field of Classification Search
USPC .................................................. 342/357.23
See application file for complete search history.

(56) References Cited

U.S. PATENT DOCUMENTS

| | | | |
|---|---|---|---|
| 2012/0182182 A1* | 7/2012 | Riley | G01S 19/25 |
| | | | 342/357.58 |
| 2016/0026157 A1 | 1/2016 | Baba | |
| 2017/0153332 A1* | 6/2017 | Wallace | H01Q 25/02 |
| 2018/0009454 A1* | 1/2018 | Katsuragi | G01S 19/45 |

FOREIGN PATENT DOCUMENTS

| | | | |
|---|---|---|---|
| JP | 2009075035 A | 4/2009 |
| JP | 2014215146 A | 11/2014 |
| JP | 2016031232 A | 3/2016 |

OTHER PUBLICATIONS

Written Opinion dated Feb. 14, 2017 issued in International Application No. PCT/JP2016/089155.
Masayuki Saito et al., "Jun Tencho Eisei System—Koseido Sokui ni Mukete-," Mitsubishi Denki Giho, vol. 77, No. 8, Aug. 13, 2003, pp. 11-14, §1 to §2.
Japanese Office Action dated Dec. 5, 2017 issued in counterpart Japanese Application No. 2016-060474.
Japanese Office Action dated May 29, 2018 issued in counterpart Japanese Application No. 2016-060474.

* cited by examiner

RECEPTION CONTROL DEVICE

TECHNICAL FIELD

The present invention relates to a reception control device.

BACKGROUND ART

Conventionally, as one of techniques for improving the positional accuracy of a global positioning system (GPS), a technique of receiving error correction information (for example, information of ionospheric correction or satellite clock error correction or the like) from a geostationary satellite (a stationary satellite in a satellite-based augmentation system (SBAS) or the like) or a quasi-zenith satellite (a satellite (Michibiki) in a quasi-zenith satellite system (QZSS) or the like) and improving the position accuracy has been known. According to such a technique, a positional error of about 10 m is improved to about 2 m in a good environment. Further, a technique for performing positioning using a GPS is disclosed, for example, in JP 2009-075035 A.

DISCLOSURE OF THE INVENTION

According to an aspect of the present invention, there is provided a reception control device according to one embodiment of the present invention includes a processor, wherein the processor executes: a reception parameter acquisition process of acquiring reception parameters related to reception of positioning signals from a positioning signal receiver that receives the positioning signals from positioning satellites; a first reception environment determination process of determining a reception environment on the basis of a result of determining the acquired reception parameters in accordance with determination conditions; and a reception control process of controlling an error correction signal receiver that receives an error correction signal for correcting an error of a positioning result by the positioning signals from an error correction satellite on the basis of a determination result in the first reception environment determination process.

PREFERRED MODE FOR CARRYING OUT THE INVENTION

Hereinafter, embodiments of the present invention will be described with reference to the appended drawings.

Hardware Configuration

Figure 1:
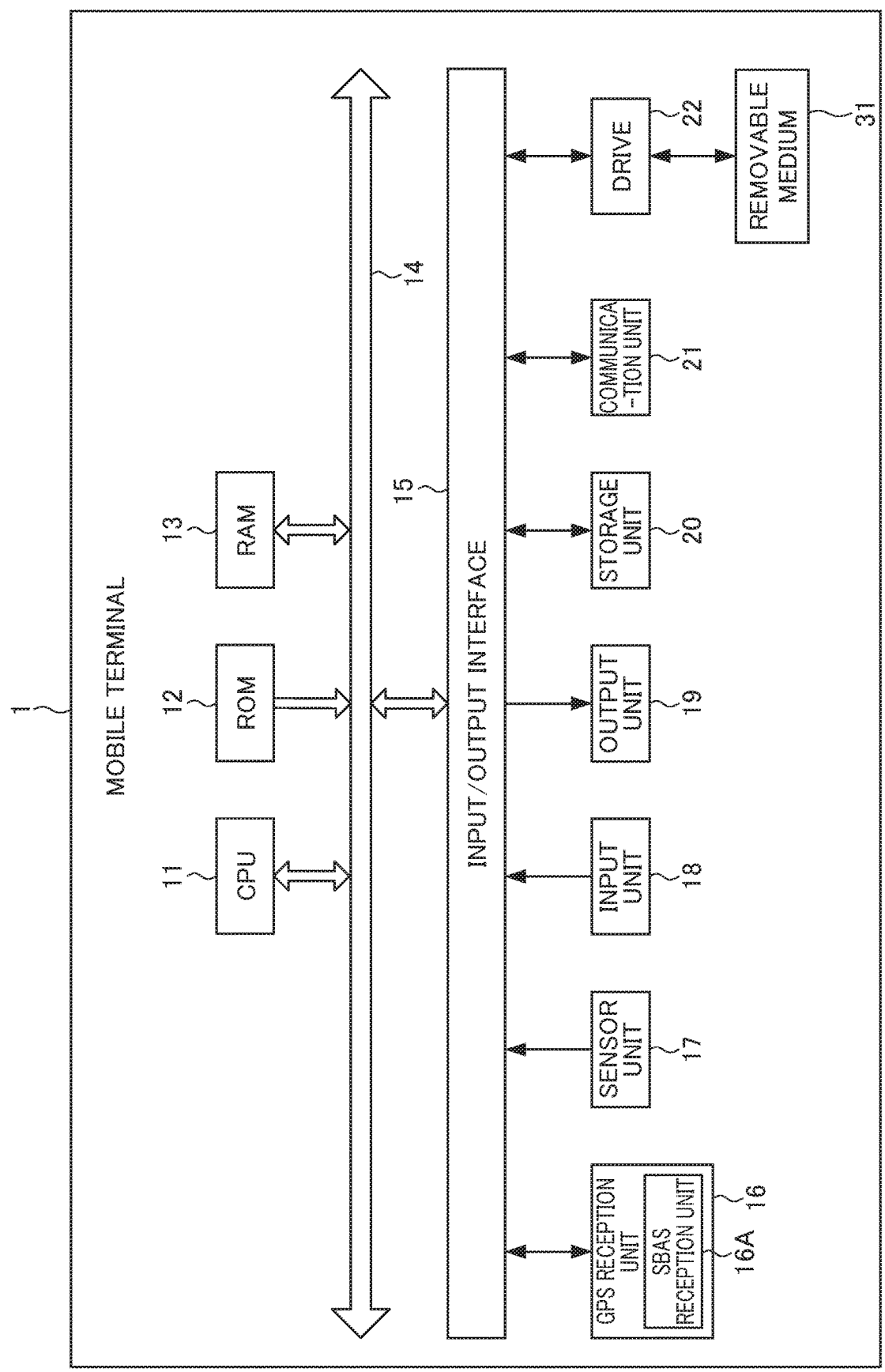
FIG. 1 is a block diagram illustrating a hardware configuration of a mobile terminal according to one embodiment of the present invention.

FIG. 1 is a block diagram illustrating a hardware configuration of a mobile terminal 1 according to one embodiment of the present invention. The mobile terminal 1 is an information processing device with a current position logging function, and is configured as, for example, smartphone.

As illustrated in FIG. 1, the mobile terminal 1 includes a central processing unit (CPU) 11, a read only memory (ROM) 12, a random access memory (RAM) 13, a bus 14, an input/output interface 15, a GPS reception unit 16, a sensor unit 17, an input unit 18, an output unit 19, a storage unit 20, a communication unit 21, and a drive 22.

The CPU 11 executes various kinds of processes in accordance with a program recorded in the ROM 12 or a program loaded from the storage unit 20 onto the RAM 13. Data or the like necessary when the CPU 11 executes various kinds of processes are appropriately stored in the RAM 13 as well.

The CPU 11, the ROM 12, and the RAM 13 are connected to one another via the bus 14. The input/output interface 15 is also connected to the bus 14. The GPS reception unit 16, the sensor unit 17, the input unit 18, the output unit 19, the storage unit 20, the communication unit 21, and the drive 22 are connected to the input/output interface 15. The GPS reception unit 16 detects a position (latitude, longitude, and altitude) of the mobile terminal 1 and a current time indicated by the GPS on the basis of GPS signals received from GPS satellites via an antenna.

Further, the GPS reception unit 16 includes an SPAS reception unit 16A. The SPAS reception unit 16A receives the satellite signals from the geostationary satellites in the SPAS via the antenna and acquires error correction information for correcting the position of the mobile terminal 1 measured by the GPS. The current position detected by the GPS reception unit 16 is corrected to a more accurate position by executing a process for position correction in the CPU 11 or the GPS reception unit 16 by using the error correction information acquired by the SPAS reception unit 16A. In the present embodiment, the CPU 11 controls an activation and a stop of the operation of the SPAS reception unit 16A.

The sensor unit 17 includes various kinds of sensors such as a gyro sensor, an acceleration sensor, and a geomagnetic sensor, and detects a posture of the mobile terminal 1 and movement, a direction, or the like of the mobile terminal 1. The input unit 18 includes various kinds of buttons, a touch panel, or the like, and receives various kinds of information in accordance with an instruction operation by a user.

The output unit 19 includes a display, a speaker, or the like, and outputs an image or a sound. The storage unit 20 includes a hard disk, a flash memory, or the like, and stores data of various kinds of images. The communication unit 21 controls communication performed with another apparatus (not illustrated) via a network including the Internet.

A removable medium 31 such as a magnetic disk, an optical disk, a magneto-optical disk, a semiconductor memory, or the like is appropriately loaded onto the drive 22. A program read from the removable medium 31 by the drive 22 is installed in the storage unit 20 if necessary. The removable medium 31 can store various kinds of data such as data of images stored in the storage unit 20, similarly to the storage unit 20.

Functional Configuration

Figure 2:
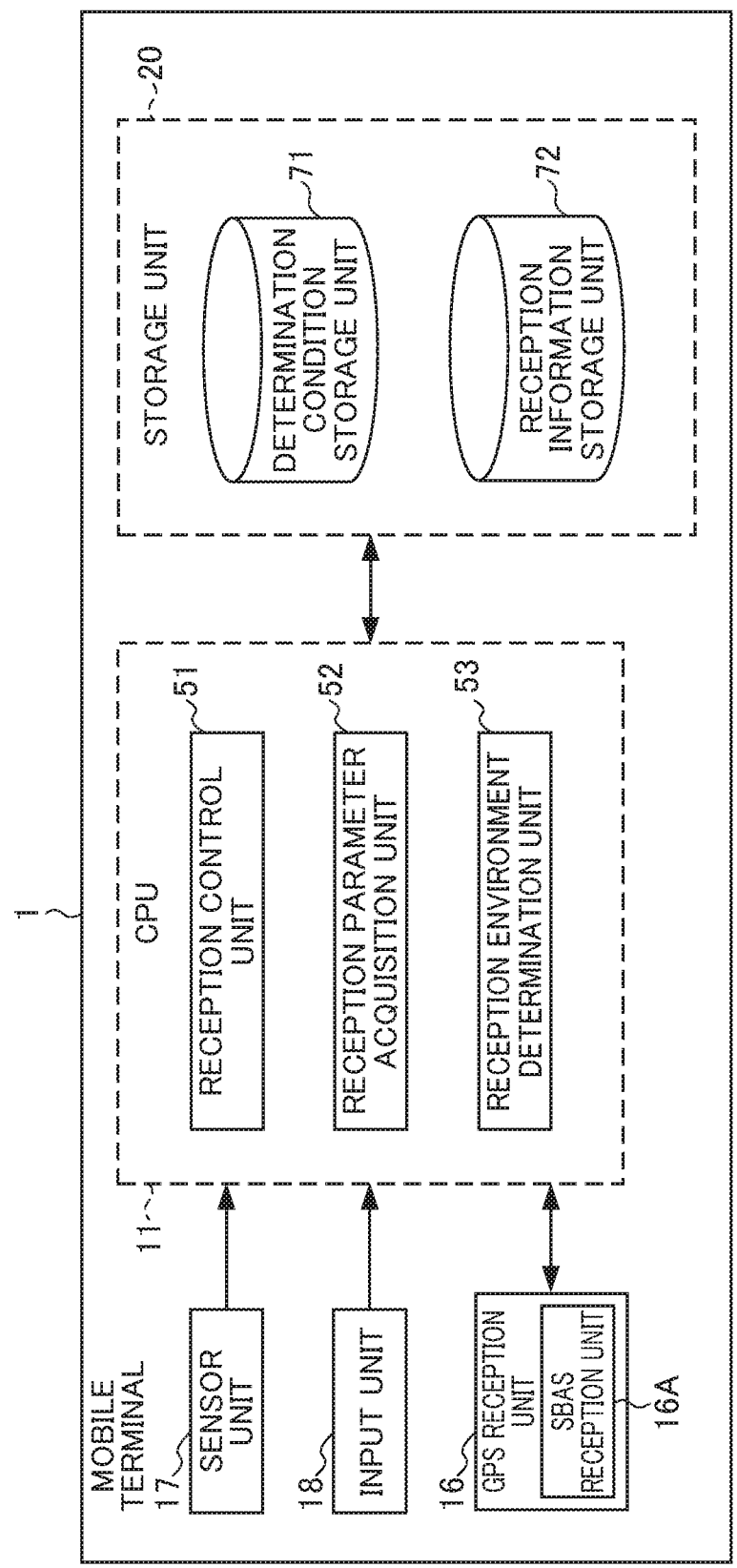
FIG. 2 is a functional block diagram illustrating a functional configuration for executing a signal reception process in the functional configuration of the mobile terminal of FIG. 1.

FIG. 2 is a functional block diagram illustrating a functional configuration for executing a signal reception process in the functional configuration of the mobile terminal 1 of FIG. 1. The signal reception process refers to a series of processes for receiving the satellite signals of the GPS satellites for positioning, controlling an operation of receiving the satellite signals in the SBAS in accordance with a reception environment, and acquiring the error correction information.

When the signal reception process is executed, a reception control unit 51, a reception parameter acquisition unit 52, and a reception environment determination unit 53 function in the CPU 11 as illustrated in FIG. 2. A determination condition storage unit 71 and a reception information storage unit 72 are set in an area of the storage unit 20.

Data of conditions related to various kinds of parameters for determining whether or not the reception environment for the satellite signals from the GPS satellite is good (hereinafter referred to appropriately as "good reception environment conditions") is stored in the determination condition storage unit 71. In the present embodiment, the following conditions are stored in the determination condition storage unit 71 as the good reception environment conditions.

(Determination condition 1) The number of receivable GPS satellites is greater than 7.
(Determination condition 2) An average of reception signal levels (C/N) of the respective GPS satellites is larger than 35 [dB-Hz].
(Determination condition 3) The satellite arrangement is in a good condition (DOP<3).
(Determination condition 4) An error indicated by position error information derived from a reception state of the GPS signals is small (a longitude/latitude error standard deviation (GST) in an NMEA format<4 [m]).
(Determination condition 5) An antenna posture is in a good condition (an antenna direction is less than zenith±30 degree).
(Determination condition 6) A duration of a state in which the determination conditions 1 to 5 are satisfied is longer than a certain period of time (longer than 5 minutes).

The numerical values in the determination conditions 1 to 6 are examples and can be appropriately changed in accordance with specifications of a positioning system, the mobile terminal 1, or the like to be used. Information (almanac data and ephemeris data) indicated by the satellite signals received from the GPS satellites and information (the error correction information) indicated by the satellite signals received from the geostationary satellites in the SBAS are stored in the reception information storage unit 72.

The reception control unit 51 controls an activation and a stop of each of the GPS reception unit 16 and the SBAS reception unit 16A. Specifically, the reception control unit 51 causes the GPS reception unit 16 to be activated as the signal reception process starts, and causes the GPS reception unit 16 to be stopped as the signal reception process ends. Further, the reception control unit 51 causes the SBAS reception unit 16A to be activated or stopped in accordance with a determination result of the reception environment determination unit 53. Specifically, when the reception environment determination unit 53 determines that the reception environment is good, the reception control unit 51 causes the SBAS reception unit 16A to be activated.

On the other hand, when the reception environment determination unit 53 determines that the reception environment is bad, the reception control unit 51 causes the SBAS reception unit 16A to be stopped. Further, when the reception environment determination unit 53 determines that the reception environment is a quasi-good state (to be described later), the reception control unit 51 switches the start and the stop of the SBAS reception unit 16A in accordance with a setting in the mobile terminal 1.

In the present embodiment, it is possible to set a power consumption priority mode in which a priority is given to power consumption reduction of the mobile terminal 1 and a positioning accuracy priority mode in which a priority is given to the improvement of the positioning accuracy, and any one of the power consumption priority mode and the positioning accuracy priority mode is set by the user. Then, when the power consumption priority mode is set, and it is determined that the reception environment is in the quasi-good state, the SBAS reception unit 16A is stopped. On the other hand, when the positioning accuracy priority mode is set, and it is determined that the reception environment is in the quasi-good state, the SBAS reception unit 16A is activated.

As described above, when the reception environment is in the quasi-good state, the start and the stop of the SBAS reception unit 16A is switched depending on the mode, and thus it is possible to realize the operation of the mobile terminal 1 matching the purpose of the user.

The reception parameter acquisition unit 52 acquires various kinds of parameters (reception parameters) related to signal reception on the basis of the reception result of the satellite signals by the GPS reception unit 16. Specifically, the reception parameter acquisition unit 52 acquires the number of receivable GPS satellites, the reception signal level of each GPS satellite, the satellite arrangement, the position error information derived from the reception states of the GPS signals, and the antenna posture detected from the detection result of the sensor unit 17.

The reception environment determination unit 53 determines whether or not the reception parameters acquired by the reception parameter acquisition unit 52 satisfy the good reception environment conditions stored in the determination condition storage unit 71. Specifically, the reception environment determination unit 53 determines whether or not the respective determination conditions are satisfied, that is, determines (determination condition 1) whether or not the number of receivable GPS satellites is greater than 7, (determination condition 2) whether or not the average of the reception signal levels (C/N) of each GPS satellites is larger than 35 [dBHz] (Determination condition 3) whether or not the satellite arrangement is in the good condition (DOP<3), (determination condition 4) whether or not the error indicated by the position error information derived from the reception states of the GPS signals is small (the longitude/latitude error standard deviation in the NMEA format (GST)<4 [m]), (determination condition 5) whether or not the antenna posture is in the good state (the antenna direction is less than zenith±30 degree), and (determination condition 6) whether or not a duration of a state in which the determination conditions 1 to 5 are satisfied is longer than a certain period of time (longer than 5 minutes).

In the present embodiment, a level corresponding to an importance indicating the state of the reception environment is set to the determination conditions determined by the reception environment determination unit 53. Specifically, "level 1" indicating that the importance indicating the state of the reception environment is high is set to the determination conditions 1 to 3, and a level 2 indicating that the importance indicating the state of the reception environment is relatively low is set to the determination conditions 4 and 5.

The reception environment determination unit 53 determines that the reception environment is in the good state when all of the determination conditions 1 to 6 are satisfied.

On the other hand, when the determination conditions 1 to 3 of the level 1 are satisfied, but any one of the determination conditions 4 and 5 of the level 2 is not satisfied, the reception environment determination unit 53 determines that the reception environment is in a state equivalent to the good state (hereinafter referred to as a "quasi-good state").

The determination condition 6 is not a determination condition directly indicating the state of the reception environment, but it is an important factor in determining whether or not the reception environment is good or bad, and thus in the present embodiment, even when the reception environment is determined to be in either the good state and the quasi-good state, a condition that it has to be satisfied consistently similarly to the determination condition of the level 1 is set to.

Further, when any one of the determination conditions 1 to 3 of the level 1 is not satisfied, the reception environment determination unit 53 determines that the reception environment is in the bad state.

Operation

Figure 3:
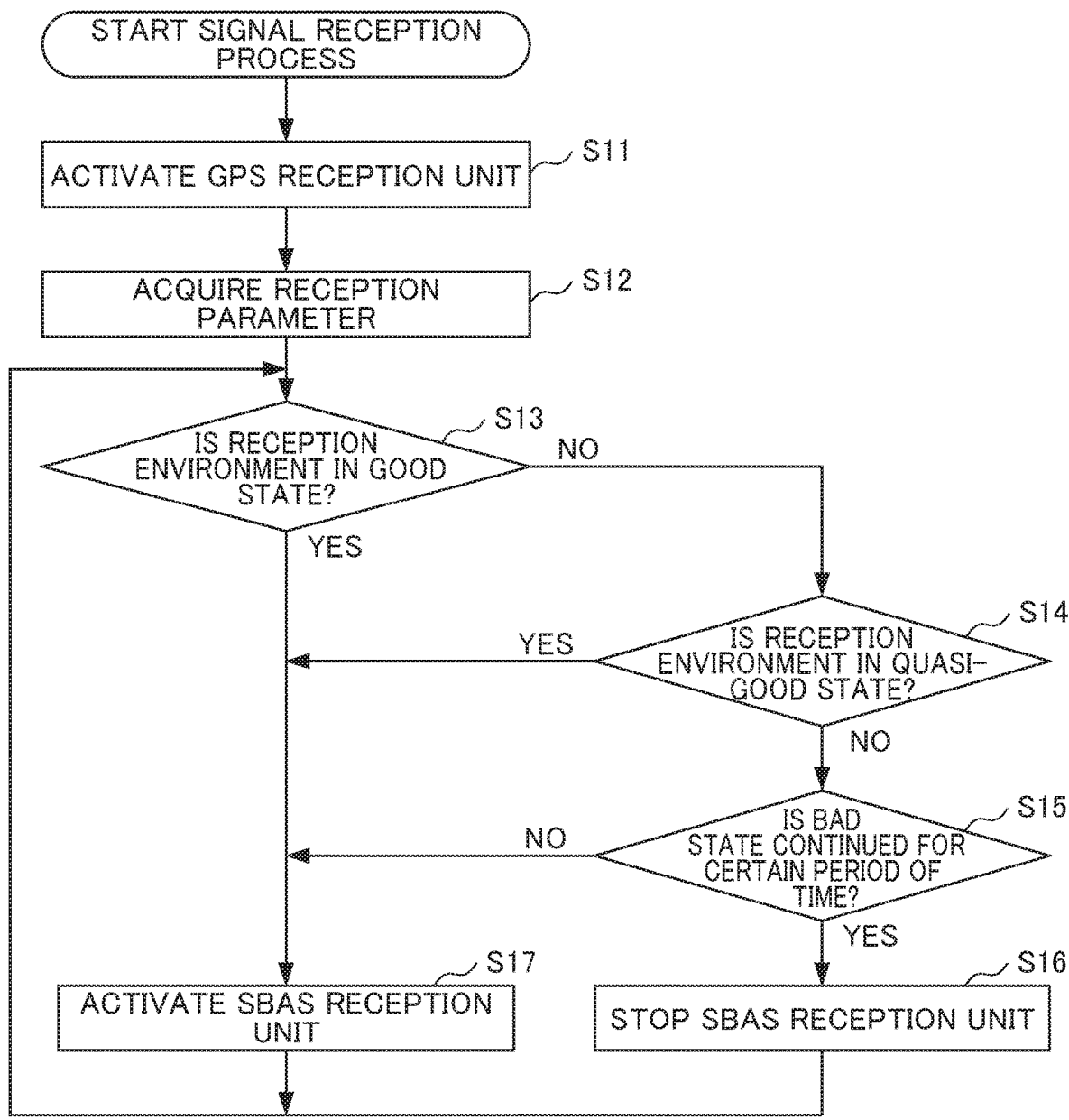
FIG. 3 is a flowchart, illustrating a flow of a signal reception process executed by the mobile terminal of FIG. 1 having the functional configuration of FIG. 2.

FIG. 3 is a flowchart illustrating a flow of a signal reception process executed by the mobile terminal 1 of FIG. 1 having the functional configuration of FIG. 2. The signal reception process is started when the user performs a manipulation of starting the signal reception process on the input unit 18 and ended when the user performs a manipulation of ending the signal reception process on the input unit 13.

In step S11, the reception control unit 51 (CPU 11) activates the GPS reception unit 16. At this time, the SBAS reception unit 16A is in a stop state. In step S12, the reception parameter acquisition unit 52 (CPU 11) acquires the reception parameters for determining the reception environment from the GPS reception unit 16 and the sensor unit 17. Specifically, the reception parameter acquisition unit 52 (the CPU 11) acquires the number of receivable GPS satellites, the reception signal level of each GPS satellite, the satellite arrangement, the position error information derived from the reception states of the GPS signals, and the antenna posture detected from the detection result of the sensor unit 17.

In step S13, the reception environment determination unit 53 (the CPU 11) determines whether or not the reception environment is good. Specifically, the reception environment determination unit 53 (the CPU 11) determines whether or not all of the determination conditions 1 to 6 in the good reception environment conditions are satisfied. When the reception environment is good, YES is determined in step S13, and the process proceeds to step S17. When the reception environment is not good, NO is determined in step S13, and the process proceeds to step S14.

In step S14, the reception environment determination unit 53 (the CPU 11) determines whether or not the reception environment is in the quasi-good state. Specifically, the reception environment determination unit 53 (the CPU 11) determines whether or not a state in which the determination conditions 1 to 3 are satisfied and one of the determination conditions 4 and 5 is not satisfied lasts longer than 5 minutes.

When the reception environment is in the quasi-good state, YES is determined in step S14, and the process proceeds to step S17. Here, if the mobile terminal 1 can be set to any one of the power consumption priority mode in which a priority is given to the power consumption reduction and the positioning accuracy priority mode in which a priority is given to the improvement of the positioning accuracy, the process may to step S16 when the mobile terminal 1 is set to the power consumption priority mode, and the process may proceed to step S17 when the mobile terminal 1 is set to the positioning accuracy priority mode.

When the reception environment is not in the quasi-good state, NO is determined in step S14, and the process proceeds to step S15. In step S15, the reception environment determination unit 53 (the CPU 11) determines whether or not the state in which the reception environment is bad is continued for a certain period of time (30 seconds in the present embodiment). When state in which the reception environment is bad is not continued for a certain period of time, NO is determined in step S15, and the process proceeds to step S17. When state in which the reception environment is had is continued for a certain period of time, YES is determined in step S15, and the process proceeds to step S16.

In step S16, the reception control unit 51 (the CPU 11) causes the SBAS reception unit 16A to be stopped. When the SBAS reception unit 16A is already in the stop state, the stop state is continued. After step S16, the process proceeds to step S13.

In step S17, the reception control unit 51 (the CPU 11) causes the SBAS reception unit 16A to be activated. When the SEAS reception unit 16A is already in an active state, the active state is continued. After step S17, the process proceeds to step S13.

With such a process, when the reception environment for the GPS signals is in the good state, the SBAS reception unit 16A is activated, and when the reception environment for the GPS signals is in the quasi-good state, the activation and the stop of the SBAS reception unit 16A is switched in accordance with the setting in the mobile terminal 1. Further, when the reception environment for the GPS signals is bad, the SBAS reception unit 16A is stopped. Therefore, it is possible to suppress a reduction in processing efficiency and unnecessary power consumption, and it is possible to correct the positioning position more efficiently.

In other words, in the conventional positioning device, although the SBAS reception function is provided, in most cases, a setting of whether the reception function of the SBAS is turned on or off is performed depending on an intended use at a stage of configuration of firmware software. For example, in devices such as smartphones, a setting in which the reception function of the SBAS is turned on in the case of an intended use in which an antenna is upward (for example, when used as a car navigation system), and the reception function of the SBAS is turned off in the case of an intended use in which the reception environment including the state of the antenna varies (for example, when used as a usual mobile terminal) is performed.

On the other hand, in the mobile terminal 1 of the present embodiment, the reception environment is determined in real time using the reception parameters, and when the reception environment is in the good state, the reception function of the SBAS is activated (ON), and when the reception environment is in the bad state, the reception function of the SBAS is stopped (OFF). Further, when the reception environment is in a quasi-good state, the activation or the stop of the reception function of SBAS is switched in accordance with the setting in the mobile terminal 1.

As a result, the mobile terminal 1 can suppress an operation current required for receiving the SBAS and a situation in which an unnecessary operation of a search engine of the SBAS occurs, and it is possible to improve the positioning accuracy in the mobile terminal 1 as the mobile device while increasing the battery duration or the lifespan of the battery.

First Modified Example

In the above embodiment, the example in which the reception environment determination unit 53 determines that the reception environment is in the bad state when any one of the determination conditions 1 to 3 of the level 1 is not satisfied has been described above. On the other hand, even when any one of the determination conditions 1 to 3 of the level 1 is not satisfied, it possible to analyze the reception environment, further determines whether or not it is useful to start the SBAS reception unit 16A (for example, whether or not the determination condition which is not satisfied can be supplemented to be satisfiable), and control the activation of the SBAS reception unit 16A.

Specifically, when the determination condition 1 is not satisfied, it is possible to determine the number of receivable satellites which is insufficient and activate the SBAS reception unit 16A in accordance with the number of satellites which is insufficient. In other words, when the determination condition 1 is not satisfied, if the number of receivable satellites is 7, the determination condition 1 is satisfied by adding one receivable satellite.

In this regard, when the reception environment determination unit 53 determines that one GPS satellite is missing to satisfy the determination condition 1, one of the GPS satellites is replaced with the stationary satellite of the SBAS, and the reception control unit 51 activates the SBAS reception unit 16A. Accordingly, the number of receivable satellites satisfies the determination condition 1, and the positioning accuracy using the GPS is improved. Further, since the GPS positioning result is corrected in accordance with the error correction information using the SBAS, the positioning accuracy can be further improved.

Similarly, even in a case in which the determination condition 3 is not satisfied, when the DOP when the geostationary satellite of the SBAS is added satisfies the determination condition 3, it is possible to activate the SBAS reception unit 16A. As described above, even when the determination condition of the level 1 is not satisfied by the GPS satellite, by using the SBAS satellite as one of GPS satellite and using the error correction information additionally, it is possible to improve the positioning accuracy significantly as compared with when positioning is performed using the GPS satellites only.

The present invention is not limited to the above-described embodiments, and modifications, improvements, and the like within the scope of achieving the object of the present invention are included in the present invention.

For example, as the system used for positioning, the same type of systems (GLONASS in Russia, GALILEO in EU, BeiDou in China (COMPASS), IRNSS in India, and the like) can be used in addition to the GPS. For the system for acquiring the error correction information, as the SBAS, WAAS in the United States, EGNOS in Europe, SDCM in Russia, MSAS or Sunflower in Japan, GAGAN in India, or the like can be used, and sub meter class reinforcement information L1S (L1-SAIF) or a centimeter class reinforcement information L6 (LEX) of the quasi-zenith satellite system (QZSS or the like) can be used as well.

In the above embodiments, the example in which the reception environment determination unit 53 determines the determination conditions 1 to 6 in order to determine the state of the reception environment has been described above, but the present invention is not limited thereto. In other words, in order to reduce the cost or the processing load, optimization may be performed by changing conditions, for example, by deleting the detection of the antenna posture (detection condition 5) or the like, by adding or deleting parameters appropriately, or by combining a logical sum and a logical product of the determination conditions.

Although in the embodiment described above, a tablet terminal is adopted as an example for explaining the mobile terminal 1 to which the present invention is applied, but the embodiment is not limited thereto. For example, the present invention can be applied to electronic devices in general that include reconnection processing after disconnection of communication connection. Specifically, for example, the present invention can be applied to a digital camera, a notebook personal computer, a television receiver, a video camera, a portable navigation device, a mobile phone, a portable game machine, and the like.

The processing sequence described above can be executed by hardware, and can also be executed by software. In other words, the hardware configuration of FIG. 2 is merely illustrative examples, and the present invention is not particularly limited thereto. More specifically, the types of functional blocks employed to realize the above-described functions are not particularly limited to the examples shown in FIG. 2, so long as the mobile terminal 1 can be provided with the functions enabling the aforementioned processing sequence to be executed in its entirety. A single functional block may be constituted by a single piece of hardware, a single installation of software, or a combination thereof.

The functional configurations of the present embodiment are realized by a processor executing arithmetic processing, and processors that, can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or storage medium to a computer or the like. The computer may be a computer equipped with dedicated hardware. In addition, the computer may be a computer capable of executing various functions, e.g., a general purpose personal computer, by installing various programs.

The storage medium containing such a program can not only be constituted by the removable medium 31 of FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 1 in which the program is recorded, and a hard disk included in the storage unit 20 of FIG. 1, and the like.

It should be noted that, in the present specification, the steps defining the program recorded in the storage medium include not only the processing executed in a time series following this order, but also processing executed in parallel or individually, which is not necessarily executed in a time series. Further, in this specification, the term of the system shall mean an entire apparatus composed of a plurality of apparatuses, a plurality of means and the like.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

The invention claimed is:

1. A reception control device, comprising:
   a processor, wherein the processor executes:
   a reception parameter acquisition process of acquiring a plurality of reception parameters related to reception of positioning signals from a positioning signal receiver that receives the positioning signals from positioning satellites;
   a first reception environment determination process of determining a reception environment based on a result of determining the acquired reception parameters according to a plurality of determination conditions set in the plurality of reception parameters; and
   a reception control process of controlling an error correction signal receiver that receives an error correction signal for correcting an error of a positioning result by the positioning signals from an error correction satellite based on whether the plurality of determination conditions are met,
   wherein:
   when some of the plurality of determination conditions are not met, the processor further executes a second reception environment determination process of determining whether the determination conditions that are not met are supplemented and satisfiable by the reception of the error correction signal by the error correction signal receiver, and
   the reception control process includes executing a process of receiving the error correction signal by the error correction signal receiver when it is determined in the second reception environment determination process that the determination conditions that are not met are supplemented and satisfiable by the reception of the error correction signal by the error correction signal receiver.

2. The reception control device according to claim 1, wherein the reception control process includes executing a process of receiving the error correction signal by the error correction signal receiver when all of the plurality of determination conditions are met, and executing either a process of receiving the error correction signal by the error correction signal receiver or a process of stopping the reception of the error correction signal by the error correction signal receiver according to a previously set condition when some of the plurality of determination conditions are not met.

3. The reception control device according to claim 1, wherein the reception control process includes executing a process of stopping the reception of the error correction signal by the error correction signal receiver when at least one of determination conditions selected in advance among the plurality of determination conditions are not met.

4. The reception control device according to claim 1, wherein the processor further executes a positioning process of performing positioning based on the error correction signal received by the error correction signal receiver and correcting an error of the positioning result when it is determined in the second reception environment determination process that the determination conditions that are not met are supplemented and satisfiable by the reception of the error correction signal by the error correction signal receiver.

5. The reception control device according to claim 1, wherein the reception parameters include one of:
   (1) a number of receivable positioning satellites,
   (2) reception signal levels of the respective positioning satellites,
   (3) a value indicating a satellite arrangement of the positioning satellites,
   (4) an error indicated by position error information derived from a reception state of the positioning signal, and
   (5) a direction of an antenna.

6. The reception control device according to claim 1, wherein the determination conditions include one of:
   (1) a number of receivable positioning satellites is larger than a predetermined number,
   (2) an average of reception levels of the respective positioning satellites is larger than a predetermined value,
   (3) a value indicating a satellite arrangement of the positioning satellites is smaller than a predetermined value,
   (4) an error indicated by position error information derived from a reception state of the positioning signal is smaller than a predetermined value, and
   (5) an antenna direction is less than zenith±a predetermined range.

7. The reception control device according to claim 1, wherein the determination conditions include:
   a condition that a duration of a state in which the determination conditions are met is longer than a predetermined time.

8. The reception control device according to claim 6, wherein the reception control process includes executing a process of stopping the reception of the error correction signal by the error correction signal receiver when it is determined in the first reception environment determination process that at least one of the determination conditions (1) to (3) among the plurality of determination conditions is not met.

9. A positioning control method used in a reception control device, comprising:
   acquiring a plurality of reception parameters related to reception of positioning signals from a positioning signal receiver that receives the positioning signals from positioning satellites;
   determining a reception environment based on a result of determining the acquired reception parameters according to a plurality of determination conditions set in the plurality of reception parameters;
   controlling an error correction signal receiver that receives an error correction signal for correcting an error of a positioning result by the positioning signals from an error correction satellite based on whether the plurality of determination conditions are met;
   determining, when some of the plurality of determination conditions are not met, whether the determination condition that are not met are supplemented and satisfiable by the reception of the error correction signal by the error correction signal receiver; and receiving the error correction signal by the error correction signal receiver when it is determined that the determination conditions that are not met are supplemented and satisfiable by the reception of the error correction signal by the error correction signal receiver.

10. A computer readable, non-transitory recording medium having stored thereon a program that causes a computer of a reception control device to execute operations of:

acquiring a plurality of reception parameters related to reception of positioning signals from a positioning signal receiver that receives the positioning signals from positioning satellites;

determining a reception environment based on a result of determining the acquired reception parameters according to a plurality of determination conditions set in the plurality of reception parameters;

controlling an error correction signal receiver that receives an error correction signal for correcting an error of a positioning result by the positioning signals from an error correction satellite based on whether the plurality of determination conditions are met;

determining, when some of the plurality of determination conditions are not met, whether the determination condition that are not met are supplemented and satisfiable by the reception of the error correction signal by the error correction signal receiver; and receiving the error correction signal by the error correction signal receiver when it is determined that the determination conditions that are not met are supplemented and satisfiable by the reception of the error correction signal by the error correction signal receiver.

* * * * *